(12) United States Patent
Stefansky et al.

(10) Patent No.: US 6,429,555 B1
(45) Date of Patent: Aug. 6, 2002

(54) SPINDLE MOTOR FOR A HARD DISC DRIVE WITH A COMBINATION SEAL AND ELECTRICAL CONNECTOR

(75) Inventors: Frederick Mark Stefansky, Longmont; Wallis Allen Dague, Louisville, both of CO (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/495,077

(22) Filed: Jan. 31, 2000

Related U.S. Application Data

(60) Provisional application No. 60/133,183, filed on May 7, 1999.

(51) Int. Cl.[7] .......................... H02K 11/00; H02K 5/10
(52) U.S. Cl. .................................. 310/71; 310/88
(58) Field of Search ............................ 310/71, 67 R, 310/91, 89, 42, 43, 85, 88

(56) References Cited

U.S. PATENT DOCUMENTS

| | | | |
|---|---|---|---|
| 4,104,484 A | | 8/1978 | Ijlstra et al. ................. 174/151 |
| 4,554,491 A | * | 11/1985 | Plunkett ..................... 310/186 |
| 4,585,693 A | | 4/1986 | Wilkinson, Jr. et al. ... 310/67 R |
| 4,626,721 A | | 12/1986 | Ouchi .......................... 310/71 |
| 4,672,250 A | | 6/1987 | Seitz ............................. 310/90 |
| 4,866,317 A | | 9/1989 | Katayama .................... 310/89 |
| 5,013,947 A | | 5/1991 | Ide ............................ 310/67 R |
| 5,142,174 A | | 8/1992 | Ide ............................ 310/67 R |
| 5,157,293 A | * | 10/1992 | Escaravage .................. 310/43 |
| 5,214,326 A | | 5/1993 | Yonei ........................ 310/67 R |
| 5,215,385 A | | 6/1993 | Ide ............................... 384/100 |
| 5,254,892 A | | 10/1993 | Bosman et al. ............ 310/49 R |
| 5,274,288 A | | 12/1993 | Stefansky .................... 310/90 |
| 5,315,464 A | | 5/1994 | Tsujino .................... 360/99.08 |
| 5,333,079 A | * | 7/1994 | Takegami et al. ......... 360/99.08 |
| 5,396,384 A | | 3/1995 | Caldeira et al. .......... 360/98.01 |
| 5,444,315 A | | 8/1995 | Adam et al. ................... 310/42 |
| 5,600,514 A | | 2/1997 | Fukuzawa ................. 360/99.08 |
| 5,621,582 A | | 4/1997 | Stefansky ..................... 360/75 |
| 5,635,781 A | * | 6/1997 | Moritan ........................ 310/71 |
| 5,661,352 A | | 8/1997 | Oguchi et al. ................ 310/71 |
| 5,705,868 A | | 1/1998 | Cox et al. ..................... 310/71 |
| 5,861,689 A | | 1/1999 | Snider et al. ................. 310/71 |
| 5,900,903 A | * | 5/1999 | Fukita ......................... 310/105 |
| 5,986,365 A | * | 11/1999 | Kuwert et al. ................ 310/51 |

FOREIGN PATENT DOCUMENTS

| | | | |
|---|---|---|---|
| JP | 410191609 A | * | 7/1998 |
| JP | 411097104 A | * | 4/1999 |

* cited by examiner

*Primary Examiner*—Nestor Ramirez
*Assistant Examiner*—Guillermo Perez
(74) *Attorney, Agent, or Firm*—LaRiviere, Grubman & Payne, LLP

(57) ABSTRACT

Apparatus for sealing the internal spindle motor bearing structure from the surrounding environment in a hard disc memory device. The motor includes a single low-cost part that seals both airflow paths, including both the bearings of the motor and around the wires. This single part acts as the electrical connector for the spindle motor as well as the seal. The invention consists of a single injection molded plastic connector with electrical contact members contained therein. Wires from the internal windings of the spindle motor pass through a hole provided in the connector housing and are terminated to the electrical contact members located within the connector. This hole is in turn sealed with a single drop of adhesive that is cured under the application of ultraviolet light. In a preferred embodiment, the spindle motor housing and connector are designed to form a press fit between the outer diameter of the circularly shaped connector housing and a groove in the motor housing provided for this purpose.

12 Claims, 4 Drawing Sheets

SPINDLE MOTOR FOR A HARD DISC DRIVE WITH A COMBINATION SEAL AND ELECTRICAL CONNECTOR

CROSS-REFERENCE TO RELATED APPLICATION

This application claims benefit and priority from and is related to co-pending Provisional Patent Application Serial No. 60/133,183, entitled "A Spindle Motor For A Hard Disc Drive With A Combination Seal And Electrical Connector," filed May 7, 1999, by the same applicants.

BACKGROUND OF THE INVENTION

1. Field of the Invention

The present invention relates to spindle motors for use with storage disc drives and, more particularly, to a spindle motor for a disc drive that utilizes the electrical connector as the solitary means of sealing the internal motor bearing structure from the surrounding environment.

2. Description of Related Art

One requirement for the proper operation of a disc drive is that the environment inside the head-disc enclosure (HDA) be substantially cleaner then the typical environment outside of the HDA. Foreign particles, greases, and other airborne chemical compounds can attach themselves to the recording head(s) and disc(s). The presence of these substances will disrupt the air bearing generated between the recording heads and the adjacent recording media and could cause head-disc "crashes" resulting in permanent loss of data. It is equally important to seal potential flow paths through the spindle bearings where "outside" air can flow into the HDA. Air cycling through this path can carry grease particles and surfactants from the bearing grease, which are detrimental to the head disc interface for the reasons mentioned above. Such airflow can also act to deplete moisture from the bearing grease, thus reducing its lubricating efficiency and shortening bearing life. To resolve this problem, it is common in current disc drive architecture to provide a bearing cap or ferro-fluidic seal to prevent flow through the ball bearing structure and into the HDA. It is also common to provide a means for sealing airflow that can occur around the electrical motor connections. In the past, this has been done with tight tolerance labyrinth structures or the addition of a thin metal piece referred to as a "bearing cap." Both of these methods of sealing the HDA have proven to be expensive, time consuming, and process sensitive.

The cost associated with the addition of a bearing cap, ferro-fluidic seal or any other such method outlined above is not only limited to the cost of the part itself. There is an additional cost associated with the process of attaching the cap, ferro-fluidic seal, etc., to the motor, (typically, an adhesive is used). Adhesive-curing time acts to limit production throughput increasing manufacturing costs.

U.S. Pat. No. 5,274,288 to Frederick Mark Stefansky entitled "Low Noise Spin Motor For Use In Disc Drive," issued December 28, 1993, discloses a header 36 which interconnects actuator interface circuitry 38 with the control circuitry on printed circuit wiring board 14. The interface circuitry 38 is interconnected with the voice coil motor of actuator 28 through flexible ribbon cable 40. U.S. Pat. No. 5,621,582 to Frederick Mark Stefansky, entitled "Disc Drive Including A Base Plate Well For The Spin Motor," issued Apr. 15, 1997, discloses a single electrical contractor (header) that transfers all electrical signals between the exterior and the interior of the casing, thereby reducing the possibility of the introduction of contaminants to the controlled environment within the casing. Both of these patents are assigned to the same assignee as the present application, and are herein incorporated by reference for the information relating to the invention described in this application.

SUMMARY OF THE INVENTION

The present invention relates to a spindle motor including a motor housing where said motor housing has a single opening, the opening containing a connector molded to fit snugly into said single opening with the connector including a hole through which the motor drive wires pass. The connector further includes a first section and a raised portion on the first section with said raised portion having a plurality of conducting electrical contact members molded into said raised portion to which the external ends of the motor drive wires are connected. Further, the connector further comprises an annular ring on the side opposite from said raised portion of the molded connector with the annular ring being used to contact a complementary receiving area of the motor housing to cause a tight fit for said molded connector to said motor bearing. The second embodiment includes a molded electrical connector comprising a first section which is generally circularly shaped, a raised portion on one side of the first section, electrical contact members formed in said raised portion, a hole placed in said first portion, and including an annular ring on the second side of such a first section. This embodiment further includes a motor housing upon which the connectors are mounted and includes conducting wires from said motor housing passing through said holes to provide an electrical path for drive signals to said motor. The invention in this embodiment also includes an adhesive which is placed in the hole and around the wires to completely seal the hole and wires.

DESCRIPTION OF THE DRAWINGS

The present invention may be better understood, and its numerous features and advantages made apparent to those skilled in the art, by referencing the accompanying drawings. For ease of understanding and simplicity, common numbering of elements within the illustrations is employed where an element is the same in different drawings.

DETAILED DESCRIPTION OF THE INVENTION

The present invention provides an improved apparatus for sealing the internal spindle motor bearing structure from the surrounding environment in a hard disc memory device. The invention disclosed is the design of a motor which includes a single low-cost part that seals both airflow paths, including both the bearings of the motor and around the wires. This single part acts as the electrical connector for the spindle motor as well as the seal.

The design consists of a single injection molded plastic connector with electrical contact members contained therein. Wires from the internal windings of the spindle motor pass through a hole provided in the connector housing and are terminated to the electrical contact members located within the connector. This hole is in turn sealed with a single drop of adhesive that is cured under the application of ultraviolet light. In a preferred method, the spindle motor housing and connector are designed in such a way as to form a press fit between the outer diameter of the circularly shaped connector housing and a groove in the motor housing provided for this purpose. No other sealing processes are necessary. This approach eliminates the need for additional parts to seal the motor interfaces, thus reducing the associated cost and processing time.

Figure 1:
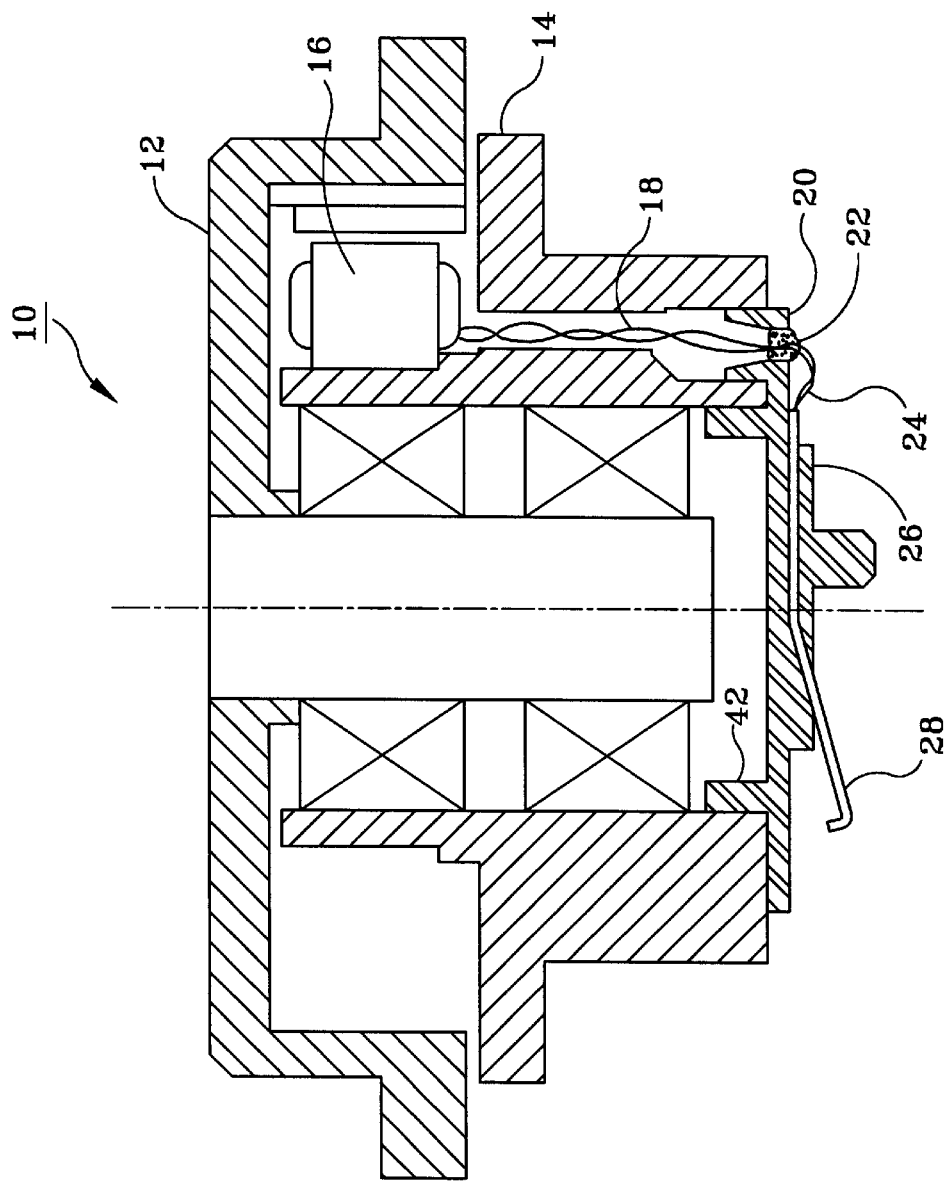
FIG. 1 is a side section view of a motor in accordance with the principles of the present invention.

The preferred embodiment of the present invention is shown in FIG. 1. Motor 10 comprises several parts which will be discussed here. The rotating part 12 of the motor 10 provides the mounting surface for the hard disc magnetic surfaces to be mounted thereon. The housing 14 of the motor 10 provides a housing which includes the rotating parts of the motor within the housing as shown in FIG. 1. The internal windings 16 within the motor housing 14 provide the turns by which the rotating part 12 of motor 10 is rotated in response to a driving electrical signal applied to windings 16 via wires 18. Wires 18 are seen to exit the motor 10 at hole 20 in the single injection molded connector 26. Molded within the connector 26 itself are the electrical contact members or connections 28 which are used to apply the signal to the motor 10. In a manner fully set forth in the prior art, motor 10 is positioned on a printed circuit board assembly (PCBA) of which electrical contact members or connectors 28 are applied in a friction pressure connection as the motor is affixed to the printed circuit board assembly (not shown).

Motor wires 18 exit the motor 10 at hole 20 in the single injection molded connector 26. This hole is filled with a single drop of adhesive 22 that is cured quickly under the application of ultraviolet light as set forth above. Once the adhesive is cured, and the motor activated in its normal operating mode, there is no path of air motion from outside the motor through the motor and back outside the motor into the sealed chamber in which hard disc drives are typically mounted. This eliminates one source of contaminants to the surfaces of the hard drive, as well as to the moving parts of the heads which are mounted in a movable relationship with the disc drive surfaces. Accordingly, the life of the disc drive is increased due to this minimization of contaminants that usually come from the driving motor.

The single injection molded connector 26 includes the portion 40 into which the electrical contact members or connectors 28 are molded. The injection molded connector portion 26 is circular in shape (FIG. 2) and includes an annular ring 42 (FIG. 1) extending up from the inner face thereof which is the diameter of the opening to motor 10 and the internal mounting system as seen in FIG. 1. The injection molded connector 26 is pressed into the bottom of the motor 10 during assembly. By extremely close tolerances, the upper annular ring 42 is pressed into the adjoining support structure within the motor 10 to complete the construction while providing for a tightly sealed arrangement for the molded connector as the bottom part of the motor 10.

Figure 2:
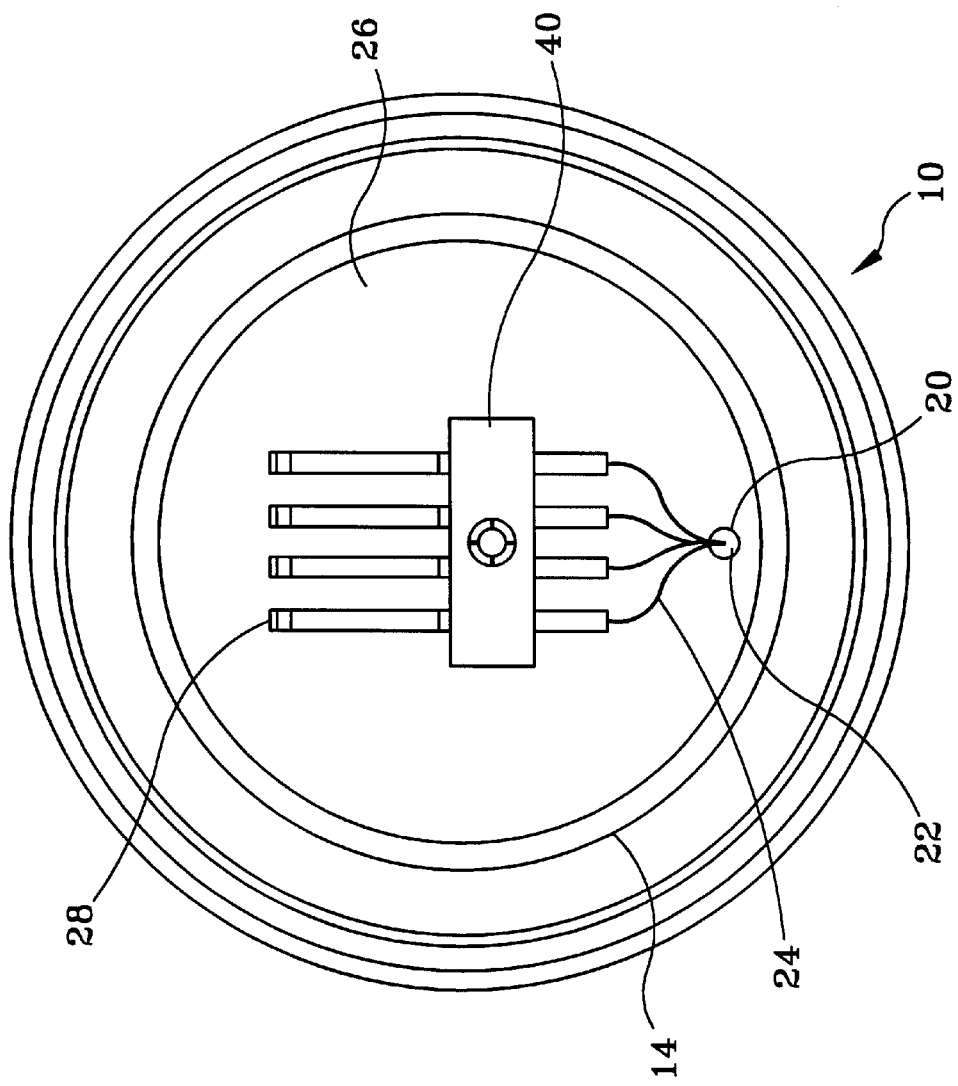
FIG. 2 is a bottom view of the motor in accordance with the present invention.

A bottom view of the motor set forth in FIG. 1 is shown in FIG. 2. Housing 14 of the motor 10 is seen in full diameter as part of the motor housing. The hole 20 is seen at the bottom of FIG. 2 from which the wires 24 emanate and are connected to the end of electrical contact members or connectors 28 by any known means such as solder or other type connection. The injection molded connector 26 is seen in FIG. 2 and comprises the entire bottom of the motor 10 and is press fitted into the motor housing 14 as seen in FIG. 1.

Figure 3:
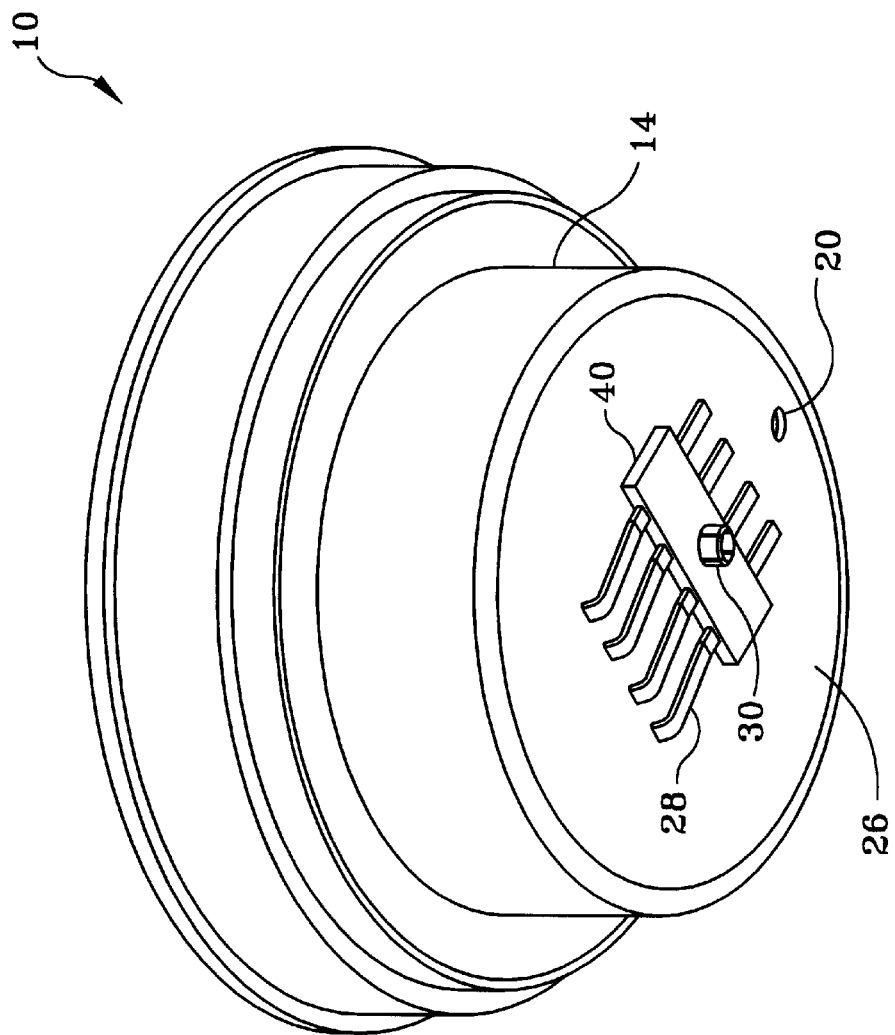
FIG. 3 is a bottom perspective view of the motor of the present invention.

An isometric view of the motor 10 shown in FIG. 2 is seen in FIG. 3. Motor housing 14 includes the enclosures of the motor seen in side section in FIG. 1. Hole 20 is seen, as are the electrical contact members or connectors 28 mounted in the injection molded connector 26. A compression grommet 30 is used to position the disc drive motor when it is mounted in a matching receiving aperture in a printed circuit board assembly.

Figure 4:
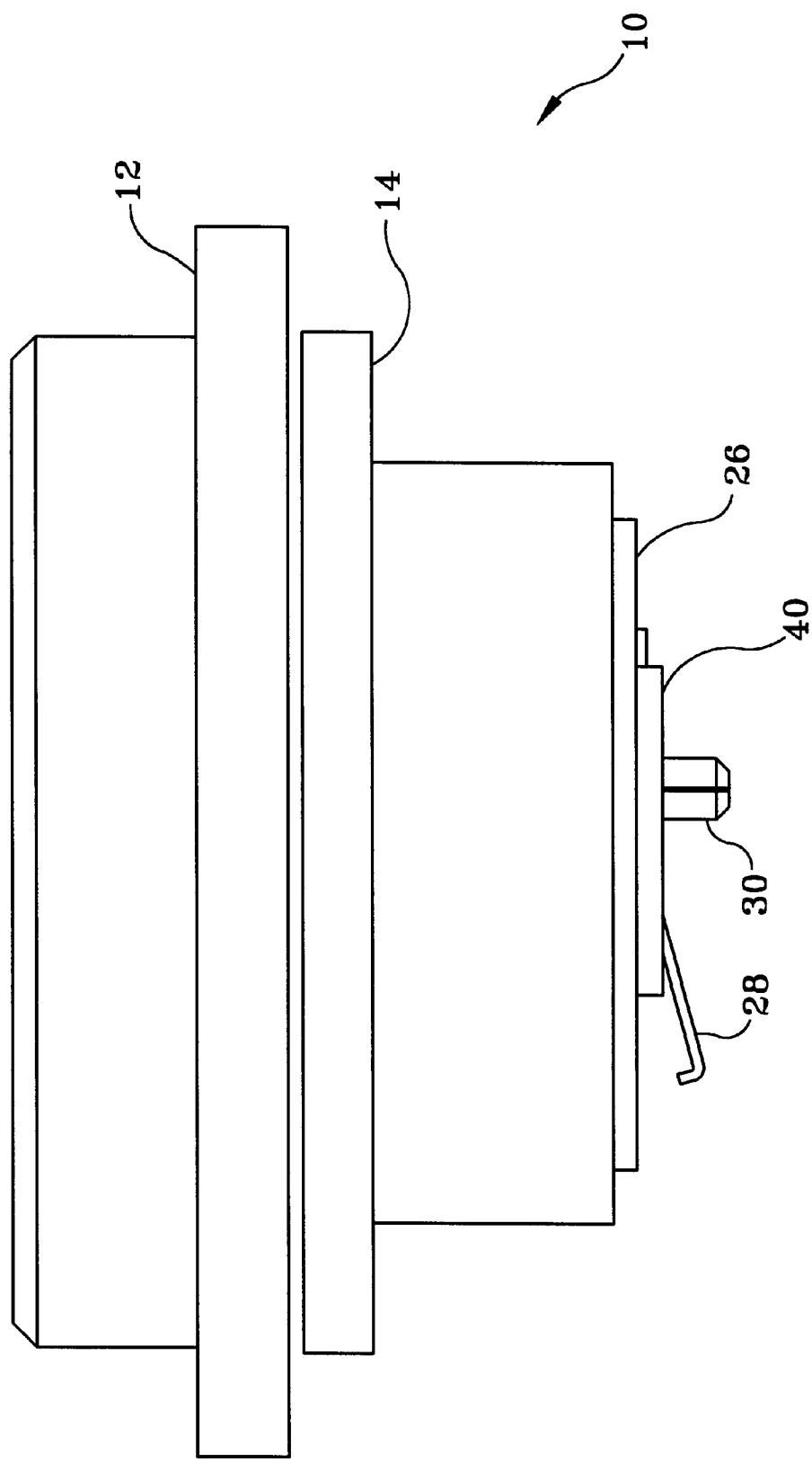
FIG. 4 is a side view of the motor in accordance with the present invention.

FIG. 4 shows a side view of the motor, in a similar arrangement as in FIG. 1, but the internals are now not seen. Thus, motor 10 includes the rotating part 12 of the motor 10 which, as set forth above, would have mounted onto it the hard disc surface platters of this disc drive arrangement. Housing 14 is the non-moving part of the motor and includes the single injection molded connector 26 as well as the electrical contact members or connectors 28. The hole 20 is not seen in this figure because it is on the bottom of the motor as seen in FIG. 3. Clearly shown in the side view in this figure is the grommet 30 which is used, as set forth above, to position the motor on a printed circuit board assembly in the assembly process.

The invention has been described above with reference to specific embodiments. It is apparent to one skilled in the art that modifications may be made and other embodiments can be used without departing from the broader scope of the invention. Therefore, these and other variations upon the specific embodiments are intended to be covered by the present invention, which is limited only by the appended claims.

What is claimed is:

1. A disc drive comprising:
   a spindle motor; and
   means operatively connected to the motor for making electrical connections thereto as well as for sealing the motor from the surrounding environment.

2. A spindle motor comprising:
   a motor housing, said motor housing having a single opening; and
   a connector molded to fit snugly into said housing in said single opening,
      said connector having an integrally-formed compression grommet for affixing said motor onto a printed circuit board assembly (PCBA),
      said connector comprising a hole through which a plurality of motor drive wires pass and extend externally from said motor housing, and
      said hole having an ultraviolet light curable (UV-curable) adhesive disposed therein and around said plurality of motor drive wires to completely seal said hole and said plurality of motor drive wires.

3. A spindle motor, as recited in claim 2, wherein said connector further comprises a first section and a raised portion disposed on an external side of said first section, said raised portion having a plurality of conducting electrical contact members molded in said raised portion to which a plurality of external ends of the plurality of motor drive wires are connected.

4. A spindle motor, as recited in claim 3, wherein said connector further comprises an annular ring disposed on an internal side of said first section of said molded connector, said annular ring being used to contact a complementary receiving area of the motor housing to cause a tight fit for said molded connector to said motor housing.

5. A spindle motor, as recited in claim 4, wherein said first section, said raised portion, and said annular ring form an integrally molded connector.

6. A spindle motor, as recited in claim 5, wherein said integrally molded connector comprises an injection-molded plastic.

7. A spindle motor, as recited in claim 6, wherein said integrally molded connector is press-fitted into said complementary receiving area in said motor housing.

8. An electrical connector comprising:

a first section comprising a generally circular shape and a hole tapped therethrough;

a raised portion disposed on an external side of said first section, said raised portion having an integrally-formed compression grommet for affixing said motor onto a printed circuit board assembly (PCBA);

a plurality of electrical contact members formed in said raised portion;

an ultraviolet light curable (UV-curable) adhesive disposed in said hole; and an annular ring disposed on an internal side of said first section.

9. An electrical connector, as recited in claim 8, further comprising:

a motor housing upon which said connector is mounted; and a plurality of conducting wires passing externally from said motor housing through said hole to provide an electrical path for drive signals to a motor.

10. An electrical connector, as recited in claim 8, wherein said annular ring is press-fit into a complementary receiving section of said motor housing, said electrical connector now forming a completely sealed motor by said connector.

11. A spindle motor comprising:

a motor housing, said motor housing having a single opening;

a connector molded to fit snugly into said single opening, said connector having an integrally-formed compression grommet for affixing said motor onto a printed circuit board assembly (PCBA), and said connector comprising a hole through which a plurality of motor drive wires pass and extend externally from said motor housing; and an ultraviolet light curable (WV-curable) adhesive disposed in said hole and around said plurality of wires to completely seal said hole and said plurality of wires, wherein said connector further comprises a first section and a raised portion disposed on an external side of said first section, said raised portion having a plurality of conducting electrical contact members molded in said raised portion to which a plurality of external ends of the plurality of motor drive wires are connected, wherein said connector further comprises an annular ring disposed on an internal side of said first section of said molded connector, said annular ring being used to contact a complementary receiving area of the motor housing to cause a tight fit for said molded connector to said motor housing, wherein said first section, said raised portion, and said annular ring form an integrally-molded connector, wherein said integrally-molded connector comprises an injection-molded plastic, and wherein said integrally-molded connector is press-fitted into said complementary receiving area in said motor housing.

12. An electrical connector comprising:

a first section comprising a generally circular shape and a hole tapped therethrough;

a raised portion disposed on an external side of said first section, said raised portion having an integrally-formed compression grommet for affixing said motor onto a printed circuit board assembly (PCBA);

a plurality of electrical contact members formed in said raised portion; and an annular ring disposed on an internal side of said first section, wherein said annular ring facilitates press-fit mounting into a complementary receiving section of a motor housing, wherein said hole facilitates a plurality of conducting wires passing externally from said motor housing through said hole to provide an electrical path for drive signals to a motor, wherein an ultraviolet light curable (UV-curable) adhesive is disposed in said hole and around said plurality of wires to completely seal said hole and said plurality of wires, and wherein said electrical connector facilitates a completely sealed motor assembly.

* * * * *

UNITED STATES PATENT AND TRADEMARK OFFICE
CERTIFICATE OF CORRECTION

PATENT NO. : 6,429,555 B1 Page 1 of 1
DATED : August 6, 2002
INVENTOR(S) : Frederick Mark Stefansky and Wallis Allen Dague It is certified that error appears in the above-identified patent and that said Letters Patent is hereby corrected as shown below:

Column 5,
Line 43, delete "(WV-curable)" and replace with -- (UV-curable) --.

Signed and Sealed this

Tenth Day of December, 2002

JAMES E. ROGAN
*Director of the United States Patent and Trademark Office*